United States Patent [19]

Abe

[11] 4,147,811
[45] Apr. 3, 1979

[54] METHOD OF, AND APPARATUS FOR, MANUFACTURING COARSE-GRAINED BEAN CURD

[75] Inventor: Masakatsu Abe, Nagoya, Japan

[73] Assignee: Tokyokikaikakogyo Kabushikikaisha, Japan

[21] Appl. No.: 768,526

[22] Filed: Feb. 14, 1977

[30] Foreign Application Priority Data

Feb. 17, 1976 [JP] Japan .................................. 51-16795
Oct. 29, 1976 [JP] Japan ................................ 51-130795
Dec. 13, 1976 [JP] Japan ................................ 51-149641

[51] Int. Cl.² ............................................. A23L 1/20
[52] U.S. Cl. ..................................... 426/634; 426/656
[58] Field of Search ................. 426/46, 634, 629, 656, 426/573

[56] References Cited

U.S. PATENT DOCUMENTS 3,943,266  3/1976  Halik et al. ........................... 426/656
3,950,550  4/1976  Katayama et al. ............... 426/656 X

FOREIGN PATENT DOCUMENTS 39819  12/1965  Japan ...................................... 426/656
551692  3/1943  United Kingdom ..................... 426/634

Primary Examiner—Robert A. Yoncoskie
Attorney, Agent, or Firm—William Anthony Drucker

[57] ABSTRACT

The disclosure is directed to the manufacture of bean curd having a coarse structure. Soybean milk is coagulated and a mass of coagulated soybean milk is broken into smaller lumps. These lumps are distributed into a plurality of continuously moving cups. Fluid soybean milk is poured into each cup to promote coagulation and bonding of its contents as the fluid milk is combined with residual coagulant solution in the cup. The cups are heated, whereby a cake of coarse-grained bean curd is produced in each cup. Disclosed also is an apparatus particularly adapted for carrying out the method.

6 Claims, 11 Drawing Figures

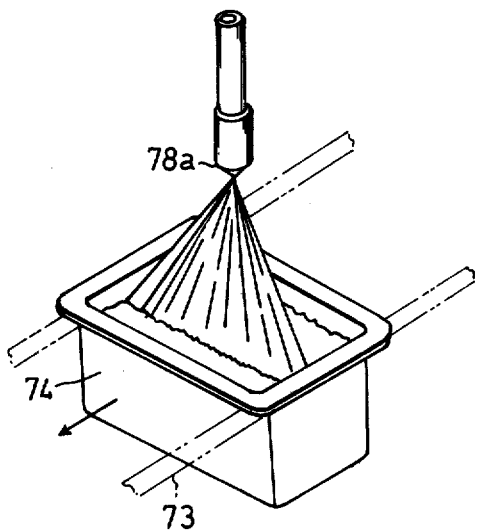
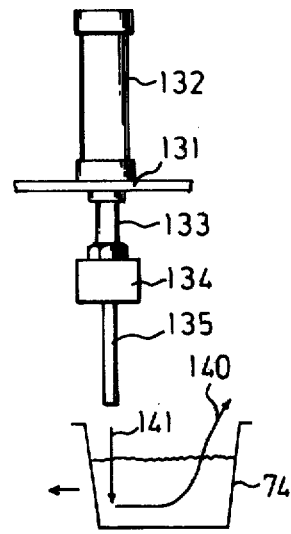
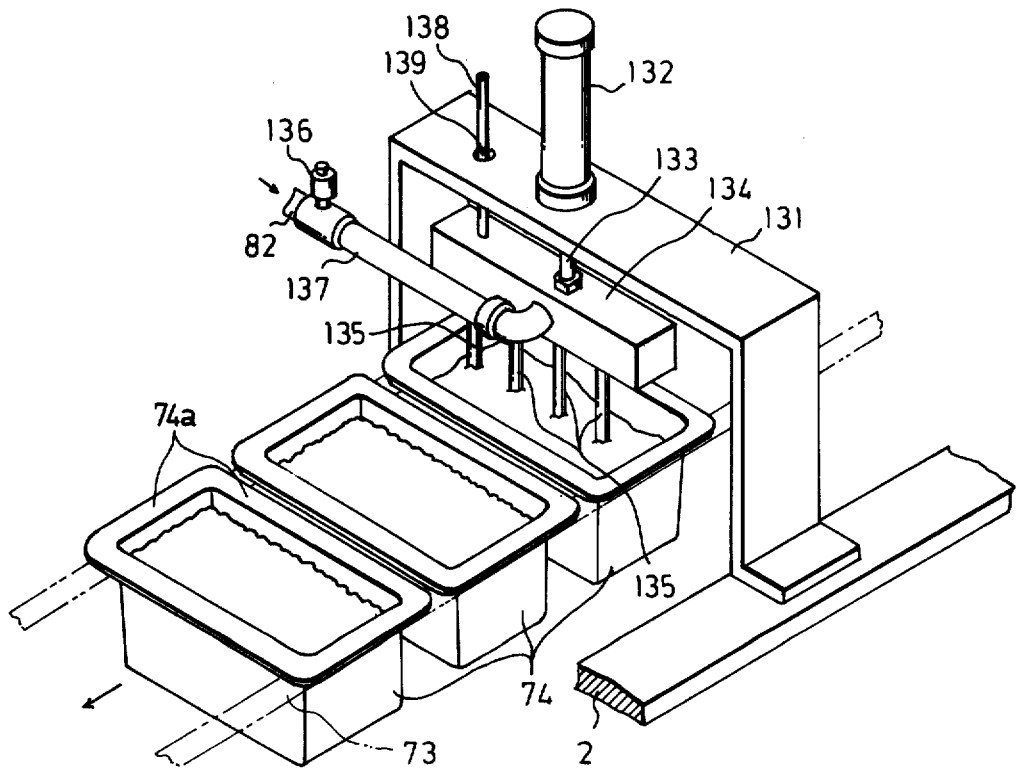

METHOD OF, AND APPARATUS FOR, MANUFACTURING COARSE-GRAINED BEAN CURD

BACKGROUND OF THE INVENTION

This invention relates to the manufacture of bean curd and more particularly, bean curd of the so-called "cotton-strained" type.

There are generally two kinds of tofu (Japanese) or bean curd, namely, silk-strained and cotton-strained. Silk-strained bean curd has a fine or dense and homogeneous structure. In order to make this bean curd, soybean milk is produced in a known manner and a coagulant is admixed into the soybean milk in a known ratio thereto. The admixture is placed into small boxes or cups and the boxes are closed by a cup sealing machine. The boxes are then heated, whereby a cake of bean curd having a fine, homogeneous structure is made in each box. Such silk-strained bean curd can be mechanically manufactured and lends itself to a high degree of mass-production.

Cotton-strained bean curd has a coarse structure and is usually made as follows. A coagulant is admixed in a known ratio into a large quantity of soybean milk prepared in a known manner, so that a mass of coagulated soybean milk is produced. The mass is crushed into a great many small lumps, and these small lumps are transferred into a large wooden box in which they are pressed together. Upon application of pressure to the lumps of coagulated soybean milk, coagulant solution is squeezed out of the lumps and they are bonded with one another to form a large piece of bean curd. This bean curd is cut by a knife into smaller pieces or cakes and these cakes are put into small boxes one by one so carefully that they are not broken. Each box is filled with water to keep a cake of bean curd in a floating condition. The boxes are then closed and shipped for sale. The cotton-strained bean curd has an excellent permeability to soy or the like because of its coarse structure when it is eaten, for example, in an iced condition. It is also delicious when cooked, because of its excellent permeability to seasoning.

SUMMARY OF THE INVENTION

This invention is directed to the manufacture of bean curd having a coarse structure analogous to the so-called "cotton-strained" bean curd.

It is an object of this invention to manufacture bean curd of the so-called "cotton-strained" type having a coarse structure in small boxes or cups by crushing a large mass of coagulated soybean milk into smaller lumps, placing those lumps into the small boxes and bonding those lumps in each box into a cake of bean curd.

It is another object of this invention to manufacture bean curd in small boxes in such a manner that a cake of bean curd in each box occupies substantially the entire volume of the box and can be maintained fixedly relative to the box against displacement and breakage within the box during transportation.

It is still another object of this invention to manufacture bean curd of the so-called "cotton-strained" type in small boxes which are sealed appropriately for ease of transportation and for storage without being decomposed over a long period of time.

It is a further object of this invention to manufacture bean curd of the so-called "cotton-strained" type in small boxes in such a manner that a cake of bean curd in each box is, after the box is sealed, sterilized under heat, whereby all the harmful germs in the box are killed and the bean curd can be stored for a long period of time without being decomposed.

It is a further object of this invention to provide an apparatus for manufacturing bean curd of the so-called "cotton-strained" type in small boxes in a highly labor-saving manner which permits the boxes to be supplied with raw materials, namely, small lumps of coagulated soybean milk and fluid soybean milk, during their movement on a conveyor system.

It is a still further object of this invention to provide an apparatus adapted for highly mechanized, streamlined mass-production of bean curd of the so-called "cotton-strained" type.

Other objects of this invention will become apparent from the following detailed description and the accompanying drawings.

BRIEF DESCRIPTION OF THE DRAWINGS

FIG. 4 is an enlarged perspective view of the soybean milk supplying device in operation;

FIG. 5 is an enlarged perspective view of the stirring device;

FIG. 6 is a side elevational view illustrating the stirring action of the device shown in FIG. 5;

DETAILED DESCRIPTION OF THE PREFERRED EMBODIMENT

Figure 1:
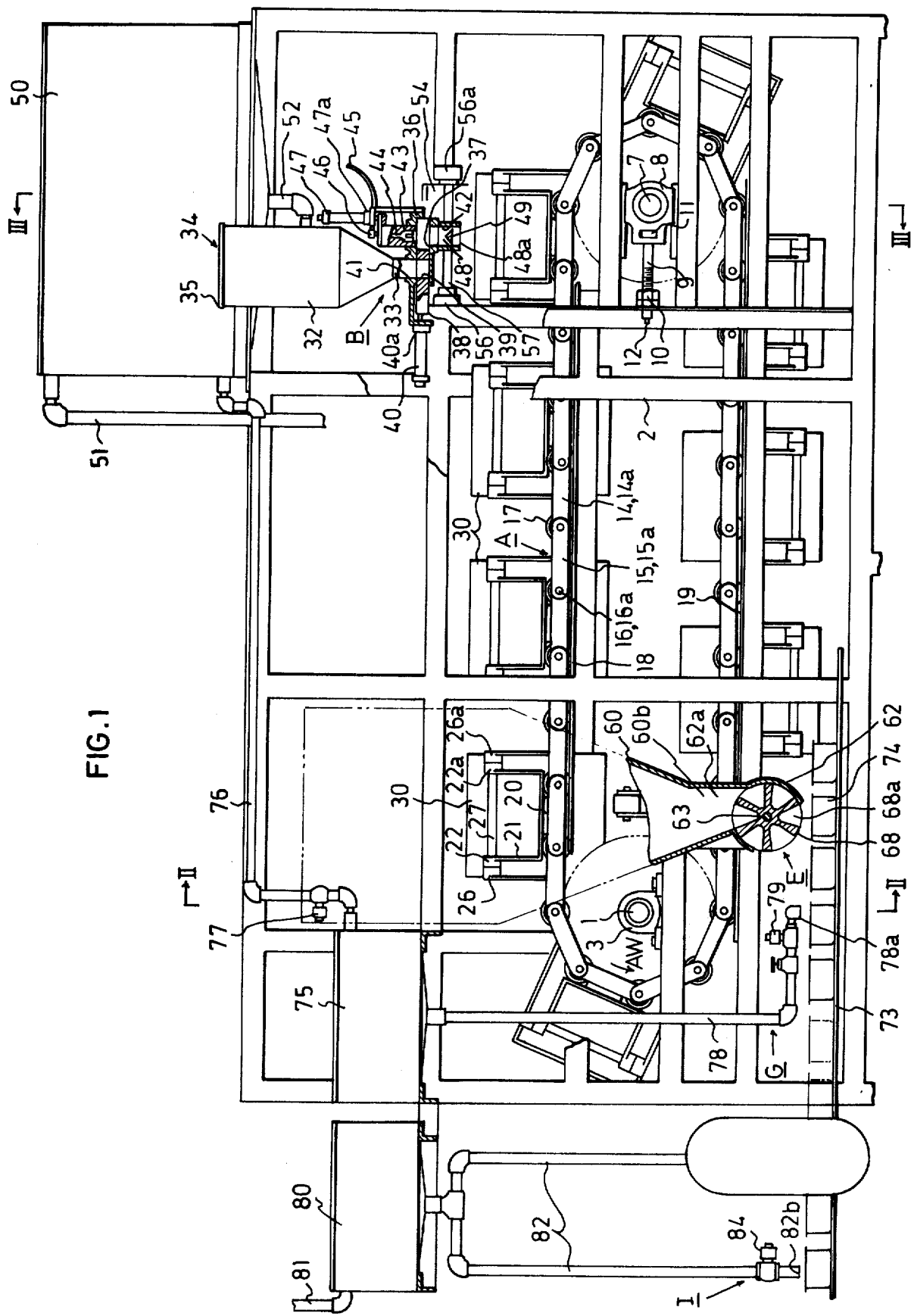
FIG. 1 is a side elevational view, partly in section, of the apparatus embodying this invention.
Figure 2:
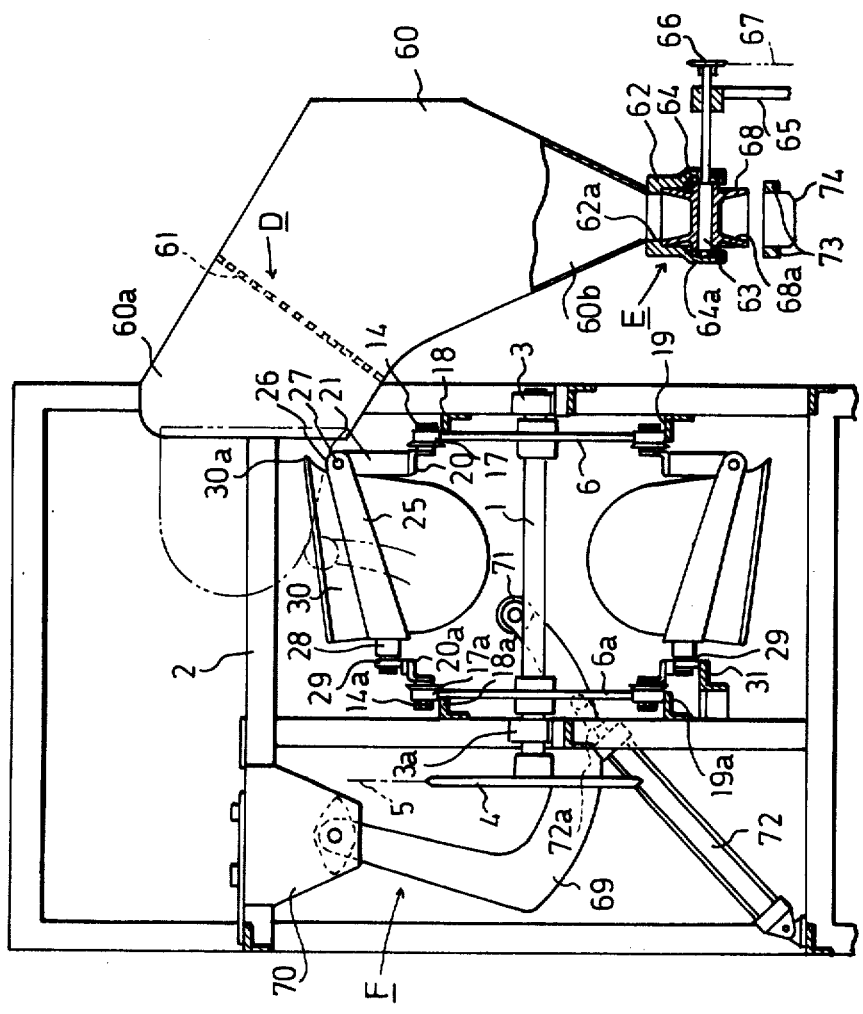
FIG. 2 is a sectional view taken along the line II—II of FIG. 1.

The apparatus embodying this invention includes a drive shaft 1 rotatably supported in a pair of bearings 3 and 3a secured to a machine frame 2. A chain wheel 4 is secured to one end of the drive shaft 1 and adapted for rotation in the direction of an arrow AW (FIG. 1) by an endless chain 5 through a drive motor and a speed reducer not shown. A pair of mutually spaced sprockets 6 and 6a each having a fairly large rim are secured to the drive shaft 1 adjacent to the opposite ends thereof as shown in FIG. 2. A driven shaft 7 is rotatably supported in a pair of bearings 8 and 8a which are in turn slidably supported on the machine frame 2 for movement toward and away from the drive shaft 1 longitudinally of the apparatus or in the right-and-left direction as viewed in FIG. 1. An adjust screw 9 adapted to move the bearing 8 and lock it in a desired position is threaded in the machine frame 2 and secured thereto by a lock nut 10. The adjust screw 9 is formed at one end with a head 11 engaging the bearing 8 and has another end 12 adapted to fit a handle for turning the screw 9. A similar adjust screw is provided for the other bearing 8a. A pair of sprockets 13 and 13a (FIG. 3) are secured to the driven shaft 7 adjacent to the opposite ends thereof and are spaced from each other at a distance equal to that which spaces the sprockets 6 and 6a on the drive shaft 1.

Figure 3:
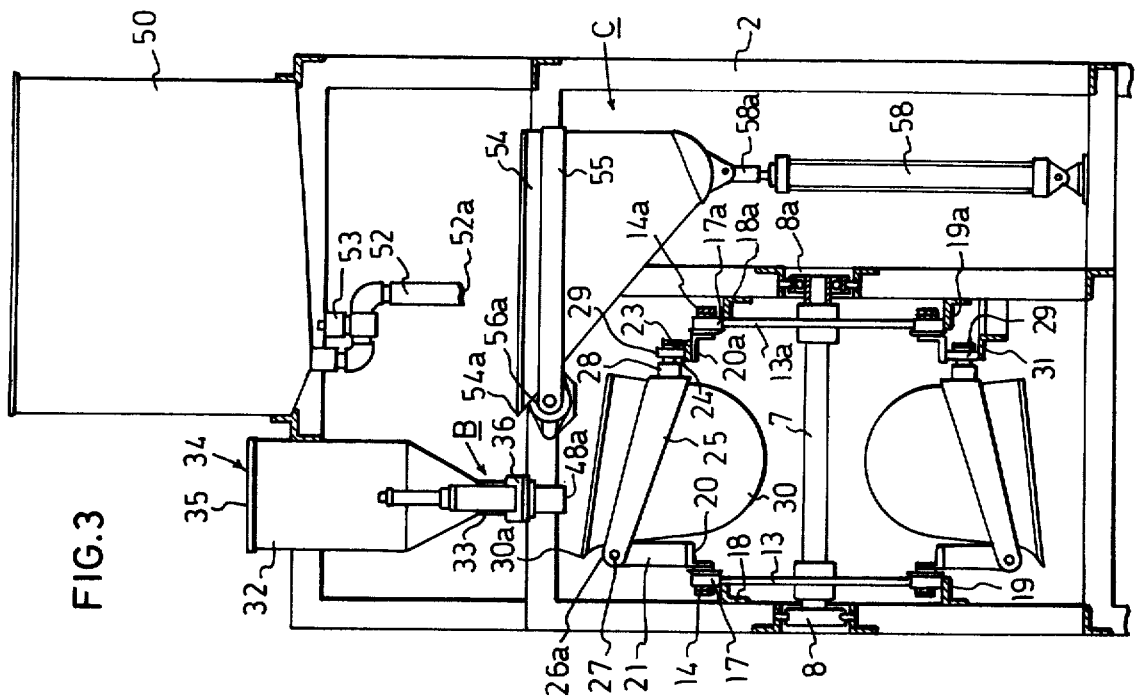
FIG. 3 is a sectional view taken along the line III—III of FIG. 1.

The apparatus includes a chain conveyor system A which comprises a pair of parallel endless chains 14 and 14a. The endless chains 14, 14a are composed of a multiplicity of links 15, 15a connected with one another by pins 16, 16a and are passed around the sprockets 6 and 13 and the sprockets 6a and 13a, respectively. A multiplicity of rollers 17, 17a are each carried rotatably on one of the pins 16, 16a. A pair of upper guide rails 18 and 18a and a pair of lower guide rails 19 and 19a are secured to the machine frame 2 to prevent the endless chains 14 and 14a from sagging between the drive and driven shafts 1 and 7. An angle-shaped bracket 20 having a flat, horizontally extending upper surface bridges the two pins 16 on every third link 15 of the endless chain 14 as shown in FIG. 1. A similar bracket 20a bridges the two pins 16a on every third link 15a of the endless chain 14a. An upstanding supporting member 23 is secured to each bracket 20 and has a pair of appropriately spaced, opposite supporting ends 22 and 22a as shown in FIG. 1. An angle-shaped supporting member 23 is secured to each bracket 20a as shown in FIG. 3 and has a recess 24 formed in a position opposite to the midway between the supporting ends 22 and 22a of the opposite supporting member 21. Each supporting member 21 cooperates with the opposite supporting member 23 in supporting a bucket holder 25 having a pair of side arms integrally connected by an end member with one another. Each bucket holder 25 has a pair of opposite ends 26 and 26a which are rotatably supported on a shaft 27 extending through the supporting ends 22 and 22a of the supporting member 21 as shown in FIG. 1. The bucket holder 25 has a short shaft 28 secured to the middle portion of its end member, and a roller 29 rotatably supported on the shaft 28 as shown in FIG. 2. The roller 29 rests in the recess 24 of each supporting member 23 as illustrated in FIG. 3. A bucket 30 having a spout 30a is secured to the side arms and end member of each bucket holder 25 by which the bucket 30 is surrounded and suspended in a space between the endless chains 14 and 14a as shown in FIGS. 2 and 3. A supporting rail 31 is secured to the machine frame 2 below the lower guide rail 19a in substantially parallel relationship therewith to support the roller 29 thereon to prevent the bucket holder 25 from falling when the bucket 30 moves along the lower sections of the endless chains 14 and 14a.

A coagulant reservoir 32 is secured to the machine frame 2 and vertically disposed in a position above the endless chains 14 and 14a in the vicinity of the driven shaft 7 as shown in FIG. 1 or 3. The coagulant reservoir 32 has a downwardly tapered lower portion terminating in an outlet end 33. The reservoir 32 has at its top an inlet end 34 closed by a lid 35, through which a pulverized coagulant, commonly bittern, is poured into the reservoir 32. The coagulants which are routine in the art may be, for example, calcium chloride ($CaCl_2$), magnesium chloride ($MgCl_2$), or calcium sulfate ($CaSO_4$).

Designated generally as B in FIGS. 1 and 3 is a coagulant measuring and delivering device adapted to measure and deliver a constant quantity of coagulant from the reservoir 32 into each bucket 30. The coagulant measuring and delivering device B comprises a body 36 secured to the machine frame 2. The body 36 is provided with a generally horizontally extending guide bore 37 having a rectangular cross-section. A pusher 38 fits closely in the guide bore 37 and is horizontally slidable relative thereto. The pusher 38 is formed therethrough with an appropriately sized, vertically extending measuring hole 39 as shown in FIG. 1. A horizontally disposed pneumatic cylinder 40 is secured to the body 36 to reciprocate the pusher 38 with a predetermined stroke. The cylinder 40 includes a piston rod 40a having an end connected to one end of the pusher 38. The body 36 is further provided with a vertically extending delivery hole 41 opening into the guide bore 37 in the upper periphery of the latter. The delivery hole 41 is so dimensioned and positioned as to overlie the measuring hole 39 in exact cross-sectional alignment therewith as shown in FIG. 1 when the pusher 38 is situated in the left-hand extremity of its stroke as viewed in FIG. 1. The delivery hole 41 is located beneath the coagulant reservoir 32 in exact vertical alignment therewith and connected with the outlet end 33 thereof to receive coagulant therethrough. The body 36 is further provided with a vertical extending guide bore 42 perpendicular to the guide bore 37. The guide bore 42 is so positioned and dimensioned as to underlie the measuring hole 39 in exact cross-sectional alignment therewith when the pusher 38 is moved forward to the right-hand extremity of its stroke as viewed in FIG. 1. A vertically disposed pusher rod 43 fits closely in the guide bore 42 and is slidable therealong. The pusher rod 43 is formed therethrough with a vertically extending water hole 44 opening at the lower end of the pusher 43. A flexible hose 45 is connected at one end to the water hole 44 through a solenoid valve 46 carried on the pusher 43 to supply water into the water hole 44. The other end of the hose 45 may be connected with an outlet of city water or any other appropriate source of water supply. A vertically disposed pneumatic cylinder 47 is carried on the body 36 and includes a piston rod 47a having a lower end connected to the upper end of the pusher 43 to reciprocate the pusher 43 vertically with a predetermined stroke. The dimensions, position and stroke of the pusher 43 are so determined relative to the guide bore 37 in the body 36 that when the piston rod 47a is in its uppermost position, the lower end of the pusher 43 is positioned above the upper periphery of the guide bore 37 as illustrated in FIG. 1, while it locates itself within the guide bore 37 when the piston rod 47a is moved to its lowermost position. A vertically disposed delivery pipe 48 has an upper inlet end connected with the guide bore 42 and a lower outlet end 48a opening in a predetermined position spaced above the path of travel of the buckets 30 on the chain conveyor system A. A baffle 49 is provided within the delivery pipe 48 to close the central portion of its outlet end 48a to thereby temporarily receive thereon a mass of coagulant forced down into the delivery pipe 48 during downward movement of the pusher 43 and dissolve it in a predetermined quantity of water through the water hole 44 before a resultant solution of coagulant is allowed to flow down through the outlet end 48a into each bucket 30.

A first soybean milk container 50 is carried on the machine frame 2 in the vicinity of the reservoir 32 for coagulant and is supplied with soybean milk through an inlet pipe 51. An outlet pipe 52 for discharging soybean milk is connected to the bottom of the container 50 and a solenoid valve 53 is provided on the outlet pipe 52 as shown in FIG. 3. The outlet pipe 52 extends downwardly and terminates in an open outlet 52a. A milk bucket 54 is positioned below the outlet 52a for transfer of soybean milk from the container 50 into each bucket 30. The milk bucket 54 is secured to a horizontally disposed holder 55 (FIG. 3) surrounding the bucket 54 on three sides thereof. A pair of springs 56 and 56a are secured to the machine frame 2 in the vicinity of the coagulant measuring and delivering device B and a shaft 57 is horizontally supported by and between the bearings 56 and 56a as shown in FIG. 1. The bucket holder 55 includes a pair of generally parallel arms each having a free end connected to the shaft 57, so that the milk bucket 54 fixedly supported by the holder 55 is tiltable about the shaft 57. The milk bucket 54 has a spout 54a located in a predetermined position above the path of travel of the buckets 30. A vertically disposed pneumatic cylinder 58 is rotatably supported on the machine frame 2 and includes a piston rod 58a having an upper end pivotally connected to the bottom of the bucket 54, as shown in FIG. 3, for tilting the bucket 54 about the shaft 57. The outlet pipe 52, the solenoid valve 53, the bucket 54 and the pneumatic cylinder 58 cooperate with one another in constituting a device for supplying a given quantity of soybean milk into each bucket 30 as generally indicated at C in FIG. 3.

A hopper 60 is fixedly supported on the machine frame 2 alongside of the chain conveyor system A in the vicinity of the drive shaft 1 as shown in FIGS. 1 and 2. The hopper 60 has an upper end portion 60a obliquely extending toward the path of travel of the buckets 30. The upper end portion 60a has a vertically disposed inlet end located above the endless chain 14 as shown in FIG. 2. This inlet end 60a of the hopper 60 opens in a position in which any bucket 30 being moved on the chain conveyor system A may have its spout 30a brought into close proximity with the hopper inlet, so that the spout 30a can project into the hopper to effectively pour the bucket contents thereinto when the bucket 30 is tilted upward as shown in broken lines in FIG. 2 as will hereinafter be described in further detail.

A bean curd breaker D (FIG. 2) is provided in the hopper 60 somewhat inwardly of its inlet end 60a. It comprises an obliquely disposed perforated plate 61 adapted to receive a mass of bean curd from each bucket 30 through the inlet end 60a and break it into smaller lumps for their further downward transfer through the hopper 60. The bean curd breaker D may alternatively comprise a wire netting or a multiplicity of bars. The hopper 60 has an outlet end 60b at its bottom.

A broken bean curd delivery device E (FIG. 2) comprises a dividing box 62 connected to the bottom of the hopper 60 for receiving broken bean curd therefrom and dividing it into smaller, substantially equally sized masses. The dividing box 62 is provided at its upper end with an inlet 62a connected to the outlet 60b of the hopper 60. A shaft 63 has one end extending horizontally through the dividing box 62 and is supported for rotation about its own axis by a pair of bearings 64 and 64a on the dividing box 62 and a supporting arm 65 secured to the machine frame 2. A chain wheel 66 is secured to the other end of the shaft 63 and a chain 67 extends around the chain wheel 66 as shown in FIG. 2 for rotating the shaft 63 about its axis upon operation of a drive motor not shown. A plurality of dividing blades 68 are provided in the dividing box 62 and radially outwardly extend from the shaft 63 as shown in FIG. 1. A small compartment 68a is defined between every two adjoining blades 68. The number of the blades 68 in the embodiment of FIG. 1 is six, so that the dividing box 62 is divided into six small compartments 68a. Each compartment 68a has a volume which is smaller than that of a bean curd box or cup 74 and which may, for example, be equal to about 10%-60% of that of the bean curd cup 74. The blades 68 are secured to the shaft 63 and rotatable therearound upon rotation of the latter. The speed of rotation of the blades 68 is associated in a predetermined fashion with that of the endless chains 14 and 14a.

FIG. 2 shows a bucket tilting device F adapted to tilt each bucket 30 upward and allow it to discharge its contents into the hopper 60. The device F includes a generally L-shaped thrust lever 69 having an upper end pivotally connected to a bracket 70 secured to the machine frame 2. The lever 69 has an arcuately curved lower leg having an upwardly directed end on which a roller 71 is rotatably supported. An obliquely disposed pneumatic cylinder 72 has a lower end pivotally connected to the machine frame 2. The cylinder 72 includes a piston rod 72a having an upper end pivotally connected to the thrust lever 69 in the lower leg thereof. The thrust lever 69 is in its lowered position shown in solid lines in FIG. 1 when the piston rod 72a is in its lowermost position, so that the roller-equipped end of the lever 69 is spaced below the bucket 30. But when the piston rod 72a is moved to its uppermost position, the lever 69 is rotated into its raised position as shown in broken lines in FIG. 2 to thrust up the bucket 30 and tilt it as shown in broken lines.

The apparatus further includes a cup transfer conveyor 73 provided below the broken bean curd delivery device E and extending immediately below the dividing blade 68 as shown in FIGS. 1 and 2. The speed of movement of the cup transfer conveyor 73 is associated in a predetermined manner with the speed of rotation of the blades 68. Numeral 74 indicates a series of bean curd boxes or cups which are successively moved on the cup transfer conveyor 73. The bean curd cups 74 may be made of plastics and furnished on the conveyor 73 continuously at the righthand end of the conveyor 73 as viewed in FIG. 1. Placement of such cups on the conveyor 73 may be accomplished either manually or mechanically in an appropriate manner. The cups 74 may have any reasonable size and shape and be made of either hard or soft material, depending upon the demand or desire of the consumers of bean curd.

The apparatus of this invention further includes a second soybean milk container 75 carried on the machine frame 2 in the vicinity of the hopper 60 as can be seen from FIG. 1. A pipe line 76 has one end connected to the upper end of the second soybean milk container 75 and another end connected to the bottom of the first soybean milk container 50. A solenoid valve 77 is provided on the pipe line 76. The second container 75 is positioned at a level lower than the first container 50 as illustrated in FIG. 1 and soybean milk is supplied from the first container 50 into the second container 75 through the pipe line 76 and the solenoid valve 77. A soybean milk delivery pipe line 78 is vertically disposed under the container 75 and has an upper end connected to the bottom thereof. The pipe line 78 is provided at its lower end with an outlet 78a located immediately above the path of travel of the cups 74. The outlet 78a is adapted to discharge soybean milk in the shape of a fan spread over the full transverse width of each cup 74 relative to the direction of its movement as illustrated in FIG. 4. In the embodiment of FIG. 1, the outlet 78a is positioned downstream of the broken bean curd delivery device E. Alternatively, it may be located upstream of the device E, so that hot soybean milk may be poured into each cup 74 before the hopper 60 feeds lumps of coagulated soybean milk into the cup 74. As a further alternative, the outlet 78a may be situated in close proximity to the outlet of the device E to permit simultaneous delivery of both coagulated and hot fluid soybean milk into each cup 74. The pipe line 78 carries a solenoid valve 79 in the vicinity of its outlet 78a. The second soybean milk container 75, the pipe line 78 and the solenoid valve 79 constitute a second given quantity soybean milk supplying device G.

A third soybean milk container 80 is supported on the machine frame 2 in the vicinity of the second container 75 as shown in FIG. 1. The third container 80 is furnished with cold soybean milk containing a predetermined quantity of coagulant through a pipe 81. An upstanding delivery pipe line 82 has an upper end connected to the bottom of the third container 80 and is bifurcated as shown in FIG. 1. One branch of the line 82 has at its lower end an outlet 82b opening immediately above the path of travel of the cups 74 on the conveyor 73. The line 82 is provided with a solenoid valve 84 in the vicinity of its outlet 82b. The third soybean milk container 80, the pipe line 82 and the solenoid valve 84 constitute a third given quantity soybean milk supplying device I.

The other branch of the bifurcated delivery line 82 has a lower end connected to a stirring device constructed as shown in FIGS. 5 and 6. The stirring device includes a generally inverted U-shaped frame 131 secured to the machine frame 2 as shown in FIG. 5. A vertically disposed pneumatic cylinder 132 is mounted on the horizontal portion of the frame 131 and includes a piston rod 133 extending downwardly through the frame 131. A hollow casing 134 having a rectangular cross-section is secured to the lower end of the piston rod 133. A plurality of mutually spaced, vertically disposed, parallel tubular stirring rods 135 extend downwardly from the bottom of the casing 134 in a comb forming fashion. The interior of each stirring rod 135 is connected with the interior of the casing 134. The delivery line 82 is provided with a solenoid valve 136 adjacent to its outlet. A flexible conduit 137 has one end connected to the outlet of the delivery line 82 and another end connected into the interior of the hollow casing 134. The horizontal portion of the frame 131 is formed therethrough with a hole 139 spaced from the cylinder 132. A vertical guide bar 138 slidably extends through the hole 139 and has a lower end secured to the top of the casing 134. The guide bar 138 is vertically movable with the movement of the casing 134 by the cylinder 132 to thereby guide the casing 134 in its vertical reciprocatory motion.

Prior to the operation of the apparatus constructed as hereinabove described, the coagulant container 32 is supplied with a pulverized coagulant and a portion of this coagulant falls down through the outlet end 33 by gravity and fills the measuring hole 39 in the coagulant measuring and delivering device B. A great many soybeans are ground and formed into sludge. This sludge is boiled in an appropriate oven or the like. Refuse or lees are separated from the product obtained by boiling, whereby soybean milk is obtained which generally has a high temperature in the approximate range of 80° to 90° C. and a density or concentration of about 10% to 15%. This soybean milk is supplied through the inlet pipe 51 and stored in the first soybean milk container 50. The second soybean milk container 75 is also fed with soybean milk through the first container 50, the line 76 and the solenoid valve 77. The third soybean milk container 80 is fed with cold soybean milk containing a predetermined quantity of coagulant and yet which has so low a temperature (for example, 50° C. to 5° C.) that no coagulation may take place.

The apparatus is now ready for operation and the drive motor is started to place the apparatus into operation. The drive shaft 1 is rotated in the direction of the arrow AW to turn the endless chains 14 and 14a at a very low velocity in a counterclockwise direction as viewed in FIG. 1. Thus, the buckets 30 tiltably supported on the chains 14 and 14a are caused to advance very slowly. It will be noted that by virtue of the rollers 29 resting on the rail 31 as shown in FIGS. 2 and 3, even those buckets 30 which come along under the endless chains 14 and 14a at predetermined intervals of time can move along in a proper fashion without falling off the chains, as they are effectively guided by the rollers 29 turning on the rail 31. When they move along over the chains 14 and 14a, the buckets 30 are maintained in a stabilized, generally horizontally disposed condition by virtue of the rollers 29 resting within the recesses 24 of the supporting members 23.

When each bucket 30 has arrived at a position immediately below the outlet end 48a of the coagulant measuring and delivering device B, it is thereby fed with a predetermined quantity of coagulant. In order that the device B may feed a predetermined quantity of coagulant into each bucket 30, the pneumatic cylinder 40 is actuated to move the pusher 38 forward to the right as viewed in FIG. 1, whereby the coagulant filling the measuring hole 39 is pushed forward or displaced to a position coinciding with the guide bore 42. Then, the vertically disposed pneumatic cylinder 47 is actuated to move down the pusher rod 43, so that the pusher rod 43 protrudes into the measuring hole 39 and pushes down the coagulant out of the hole 39. The solenoid valve 46 is opened and kept open for a predetermined length of time to pour a predetermined quantity of water through the water hole 44. This water dissolves the coagulant in the delivery pipe 48 and allows it to flow down through the outlet end 48a into the bucket 30. The baffle 49 assists uniform dissolution of the coagulant with the water, so that a uniform solution of coagulant is fed into the bucket 30.

Simultaneously with the operation of the coagulant measuring and delivering device B, the solenoid valve 53 in the first soybean milk supplying device C is opened for a predetermined length of time to feed the milk bucket 54 with a predetermined quantity of soybean milk. The pneumatic cylinder 58 is actuated to tilt the milk bucket 54, whereby the soybean milk in the milk bucket 54 is instantaneously transferred through its spout 54a into the bucket 30 and mixed with the coagulant solution therein. As soon as a predetermined quantity of water is supplied through the water hole 44, the piston rod 47a is retracted into the pneumatic cylinder 47, and the piston rod 40a into the cylinder 40, so that the coagulant measuring and delivering device B is ready for supplying coagulant into another bucket 30. The pneumatic cylinder 58 in the soybean milk supplying device C has its piston rod 58a retracted to lower the milk bucket 54 to its initial position each time the milk bucket 54 is emptied of its contents.

Each bucket 30 containing soybean milk mixed with a solution of coagulant is slowly moved on the endless chains 14 and 14a to the hopper 60. During this movement, which usually takes about two to ten minutes, the high temperature of the soybean milk brings about its coagulation to form a mass of coagulated soybean milk. In case the milk temperature is low, however, a longer time is required for coagulation of the milk. For example, if the temperature of the soybean milk is 70° C., it takes about 15 minutes for coagulation. Accordingly, it is advantageous to provide means for heating soybean milk in order to promote its coagulation. As soon as each bucket 30 is moved into close proximity to the hopper 60, the pneumatic cylinder 72 in the tilting device F is actuated to advance its piston rod 72a to swing the lever 69 by a predetermined angular distance in a counterclockwise direction as viewed in FIG. 2. The roller 71 on the free end of the lever 69 abuts on the bottom of the bucket 30 and thrusts up the bucket 30 to tilt it as shown in broken lines in FIG. 2, whereby the bucket 30 pours its contents into the inlet end 60a of the hopper 60. The piston rod 72a is retracted into the cylinder 72 to lower the bucket 30 to its initial position.

The coagulated soybean milk received in the hopper 60 is broken into smaller lumps by the bean curd breaker D or the perforated plate 61. These lumps fall down by gravity through the bottom of the hopper 60 into the compartments 68a in the dividing box 62 and fill them one after another during the rotation of the dividing blades 68. The rotation of the blades 68 causes the compartments 68a to move round and empty their contents one after another to thereby fill the cups 74 on the conveyor 73 one by one. At this stage of the bean curd making operation, however, each cup 74 is not fully filled with lumps of coagulated soybean milk, but those lumps fill each cup 74 partly, leaving an empty space in the upper portion of the cup 74. The degree of filling at this stage depends upon the quantity of additional soybean milk to be fed into the cup 74 at a later stage of the operation, but generally, it may be advisable to fill, for example, 40% to 70% of the entire volume of each cup 74. The lumps of coagulated soybean milk may be of the size of an individual soybean to a ball for table tennis by way of example. Still larger lumps may be used if they are in a semi-coagulated condition and form a mass having a highly porous structure. The speed of rotation of the dividing blades 68 is preferably considerably greater than that of movement of the endless chains 14 and 14a to enable the hopper 60 to consume all the coagulated soybean milk therein to feed a plurality of cups 74 when it receives a fresh supply of coagulated soybean milk from another bucket 30.

Each cup 74 thus partly filled with coagulated soybean milk is then moved forward by the conveyor 73 to the left as viewed in FIG. 1. When the cup 74 arrives in a position immediately below the outlet 78a of the second soybean milk supplying device G, the solenoid valve 79 is opened for a predetermined length of time to allow a predetermined quantity of soybean milk at a high temperature of about 70° C. to 90° C. to flow down from the second soybean milk container 75 into the cup 74. This additional supply of soybean milk is provided in the quantity which is sufficiently large to permit the hot soybean milk to bond with the solution of coagulant remaining among the lumps of coagulated soybean milk in the cup 74. This quantity depends upon the quantity of the coagulant supplied by the coagulant measuring and delivering device B relative to that of the soybean milk supplied by the first soybean milk supplying device C, and also depends upon the temperature of the soybean milk to be supplied. But generally, it may approximately range from 5% to 30% of the quantity of the lumps of coagulated soybean milk which look like sludge altogether. The soybean milk supplied by the second soybean milk supplying device G may be at a lower temperature if its quantity is relatively small. The outlet 78a of the device G discharges a stream of soybean milk in a uniformly spread pattern extending over the full transverse width of each cup 74 as hereinbefore noted with reference to FIG. 4. Accordingly, the contents of each cup 74 are uniformly deprived of substantially all the remaining coagulant solution in any part of the cup 74, so that the lumps of coagulated soybean milk in the cup 74 can be effectively bonded with one another during the later stage of the operation.

Each cup 74 thus supplied with additional soybean milk is moved forward to a position immediately below the stirring device as shown in FIG. 6. The cylinder 132 is actuated to move down the stirring rods 135 into the semi-coagulated soybean milk in the cup 74. As the cup 74 moves through the stirring device, the stirring rods 135 move relative to the cup 74 in a path indicated by an arrow 140 in FIG. 6 to stir the lumps of coagulated soybean milk in the cup 74. When the stirring rods 135 reach a level 141 nearly equal to the surface of the soybean milk in the cup 74 during the initial stage of their downward movement, the solenoid valve 136 is opened to permit the stirring rods 135 to start discharging cold soybean milk at a temperature from 50° C. to 5° C., preferably no higher than 25° C., when they are about to protrude into the coagulated soybean milk in the cup 74. The stirring rods 135 continue to discharge such cold soybean milk until they are withdrawn from the coagulated soybean milk in the cup 74. This cold soybean milk quickly cools down the coagulated soybean milk in the cup 74 to a temperature of approximately 30°-50° C. Thus, the coagulated soybean milk present in the form of lumps does not form a final bean curd product, but stays in a semi-finished state. The paths of movement of the lowermost ends of the stirring rods 135 as shown at 140 in FIG. 6, through which the cold soybean milk is discharged, achieve uniform distribution of such cold soybean milk within the cup 74 to thereby promote its effective admixture with the coagulated soybean milk present in the form of lumps. The quantity of the cold soybean milk supplied through the stirring rods 135 may be large enough to fill each cup 74 to its full capacity.

Alternatively, the introduction of cold soybean milk through the stirring rods 135 is discontinued to the extent that leaves in the uppermost portion of each cup 74 a still empty space nearly equal to 10% of its full capacity. Each cup 74 is then moved forward to a position immediately below the outlet 82b of the third soybean milk supplying device I. The solenoid valve 84 is opened for a predetermined short period of time to permit an additional supply of cold soybean milk to flow down from the third soybean milk container 80 into the cup 74 to fill the cup 74 to its full capacity. The quantity of the milk to be supplied by the device I may be approximately equal to 2%-4% of the entire volume of each cup 74 in order to fill it to its full capacity. It is to be understood that the operation of the strring device and the third soybean milk supplying device I may be interrupted in case any cup 74 is filled to its full capacity by the second soybean milk supplying device G.

Figure 10:
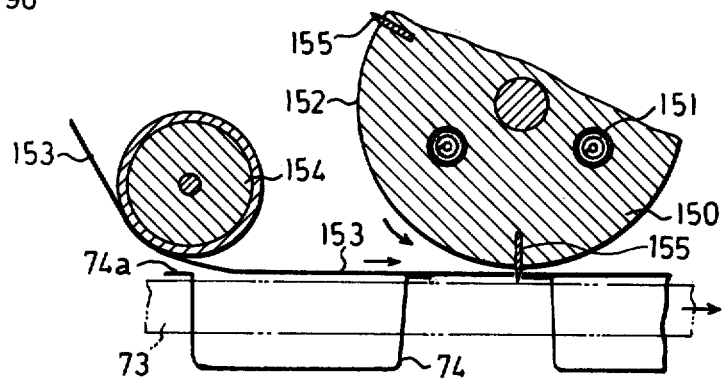
FIG. 10 is a schematic side elevational view in section of the cup sealing machine.

Each cup 74 thus filled to its full capacity is then forwarded by the conveyor 73 to a cup sealing machine. The cup sealing machine may, by way of example, be constructed as shown in FIG. 10, in which each cup 74 is moved by the conveyor 73 toward the right hand of the view. The cup sealing machine of FIG. 10 includes a sealing head 150 having a circular cross-section and adapted to rotate about its own axis in a counterclockwise direction at a circumferential speed equal to the linear speed of the conveyor 73. The sealing head 150 has a circumferential sealing surface 152 heated by an embedded heater 151. The sealing head 150 is further provided with a plurality of cutting blades 155 projecting radially outwardly from its sealing surface 152 and spaced from one another at a peripheral distance which is equal to the spacing between every two adjoining cups 74. A web of sealing material, such as a film 153 of thermoplastic resin, is continuously fed past a guide roller 154 located ahead of the sealing head 150 to rest on the upper edge 74a of each cup 74. As the cup 74 is further advanced, the film 153 is pressed against the upper edge 74a of the cup 74 by the rotating sealing surface 152 of the sealing head 150 and fused therewith by the heat of the surface 152 to thereby close the cup 74. The film 153 is then sheared transversely between the cup 74 thus closed and another immediately following cup 74.

Figure 11:
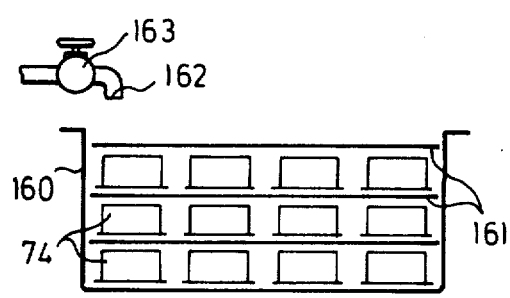
FIG. 11 is a schematic side elevational view in section of the boiling unit.

Each cup 74 thus closed is then delivered to a boiling device, in which the cup 74 is heated for integral coagulation of the lumps of coagulated soybean milk and the additional soybean milk admixed therewith. The boiling device may, for example, be constructed as schematically illustrated in FIG. 11. The device of FIG. 11 comprises a boiling tank 160 in which a a plurality of horizontally disposed racks or cup supporting plates 161 are vertically spaced from one another at a distance which is somewhat greater than the depth of the cups 74. The cups 74 delivered from the sealing machine are appropriately placed on the supporting plates 161 and a valve 163 is opened to pour warm water into the tank 160 through a pipe 162. Warm water fills the tank 160 and is circulated therethrough in an appropriate manner to heat the cups 74 for integral coagulation and sterilization of their contents. This boiling may be effected at a temperature ranging from about 60° C. to 90° C. for about 40 minutes.

The cups 74 are then cooled to prevent the growth of any germs that may have a tendency to grow at a high temperature. Such cooling may, for example, be accomplished by utilizing the boiling tank 160 of FIG. 11 and filling it with cold water, instead of warm water. The cups 74 thus cooled and each containing a final bean curd product may be shipped for sale on the market.

It will be noted that the cold soybean milk supplied by the third soybean milk supplying device I may have a tendency to flow along the internal surface of each cup 74 around a cake of bean curd therein and thereby facilitate separation of the cake from the cup 74 when it is to be eaten or cooked.

The foregoing description made with reference to the relevant drawings is merely for illustration and is not intended in any way to limit the scope of this invention to the particulars shown and described. For example, the various devices shown at B, C, E, G and I may be replaced by any other analogous means known in the art. It is possible to secure the buckets 30 to the endless chains 14 and 14a untiltably and locate the hopper 60 in a position above which the buckets 30 turn downward about the drive shaft 1, whereby the tilting device F can be eliminated. The conveyor system A for the buckets 30 may alternatively comprise an endless chain moving round in a horizontal plane or a belt conveyor. The various solenoid valves may be replaced with pneumatically operated valves in order to eliminate the possibility of hazard due to electric leakage. The cups 74 may be manually furnished one by one for receiving coagulated soybean milk from the hopper 60. It is further possible to replace the means for feeding lumps of coagulated soybean milk into the cups 74, by manual operation in which the sludge of coagulated soybean milk prepared in a separate container may be transferred into each cup 74 by a spoon or the like. Moreover, it may be possible to feed each cup 74 by a spoon with cold soybean milk containing coagulant.

Figure 7:
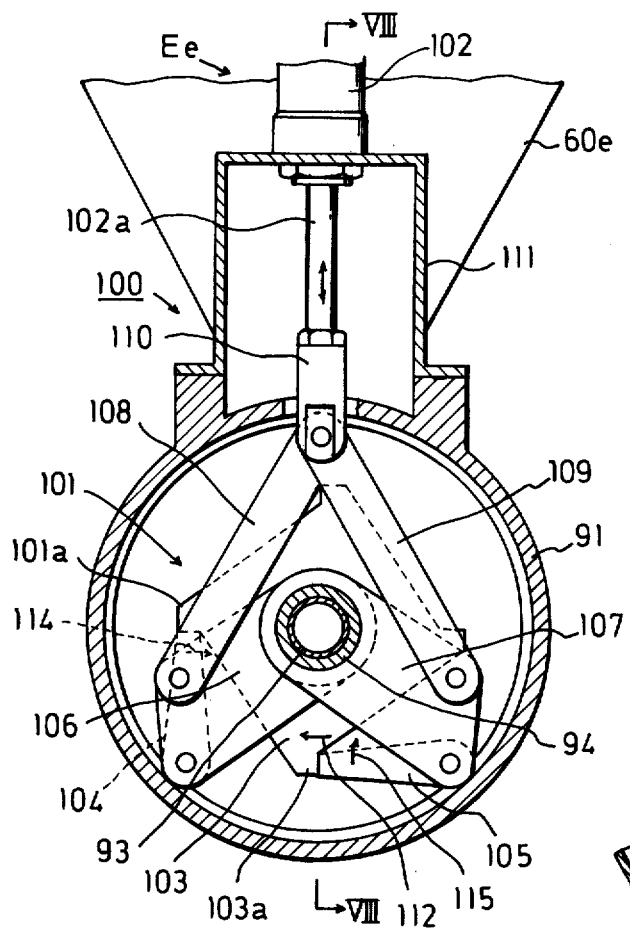
FIG. 7 is a front elevational view of a modified form of the device for supplying lumps of coagulated soybean milk, in which the device is shown in section taken along the line VII—VII of FIG. 8.
Figure 8:
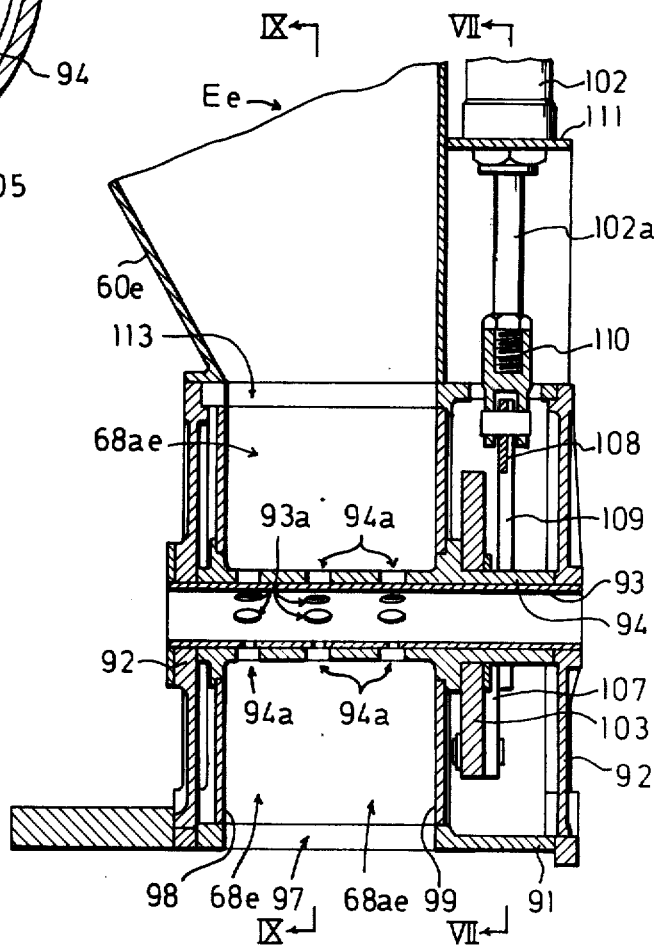
FIG. 8 is a sectional view taken along the line VIII—VIII of FIG. 7.
Figure 9:
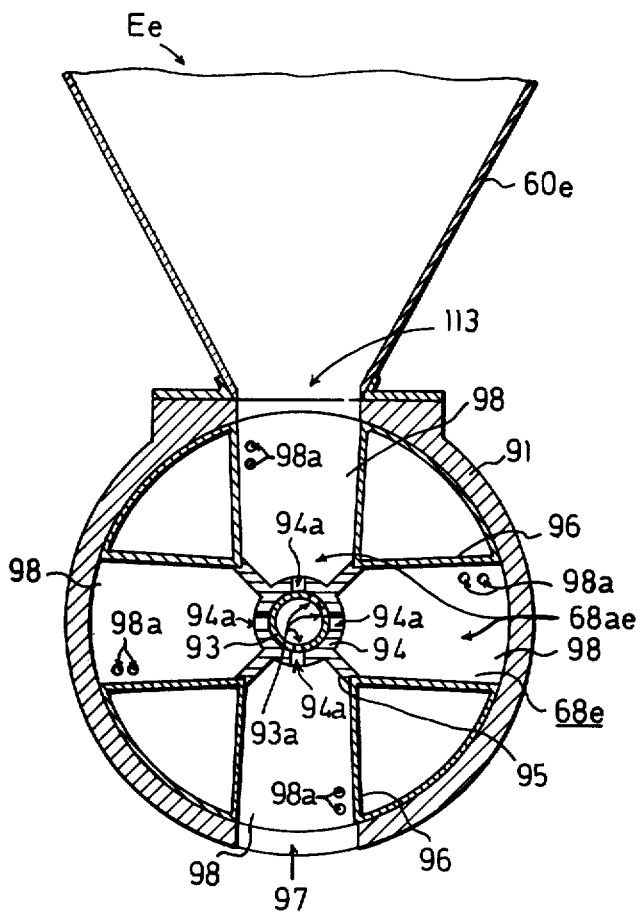
FIG. 9 is a sectional view taken along the line IX—IX of FIG. 8.

Attention is now directed to FIGS. 7 through 9 showing a modified form of the device E for feeding lumps of coagulated soybean milk into the cups 74. The modified device is generally indicated at Ee and is particularly advantageous for quicker orientation of each compartment into alignment with the outlet of the device to effect instantaneous transfer of the contents of each compartment into a bean curd cup.

The device Ee includes a horizontally disposed, hollow cylindrical casing 91 suitably secured to the machine frame 2. A pair of circular end plates 92 are secured to the opposite ends of the casing 91 as shown in FIG. 8. A hollow shaft 93 extends through the casing 91 coaxially therewith and is supported on the end plates 92 at its opposite ends. A dividing wheel 68e encircles the shaft 93 and is supported rotatably thereabout. The dividing wheel 68e includes an axial shaft 94 of the hollow cylindrical construction rotatably placed about the shaft 93 of the casing 91. A plurality of dividing walls 95 radially outwardly extend from the shaft 94 and are integrally connected with the outer peripheral surface of the shaft 94 as shown in FIG. 9. A dividing blade 96 having a V-shaped cross-section is connected at its bottom to the outer edge of each dividing wall 95 and extends or spreads substantially radially of the casing 91 as shown in FIG. 9. Every two adjoining dividing blades 96 define therebetween a dividing compartment 68ae having a generally rectangular cross-section as shown in FIG. 9. The compartments 68ae extend longitudinally of the shaft 94 and their opposite ends are closed by a pair of end walls 98 and 99 as shown in FIG. 8. The volume of each compartment 68ae is determined suitably relative to that of a bean curd cup 74, for example, to be 10% to 60% of the latter.

The shaft 93 is formed radially therethrough with a plurality of apertures 93a except for the area defined by an angular distance of about 45° on either side of the vertical plane extending through the longitudinal axis of the shaft 93. Likewise, the shaft 94 is provided radially therethrough with a plurality of apertures 94a opening to the compartments 68ae. The apertures 94a of the shaft 94 are positioned for selective alignment with the apertures 93a of the shaft 93 upon rotation of the dividing wheel 68e as shown in FIG. 9. The end wall 98 is provided therethrough with a plurality of drain holes 98a as shown in FIG. 9.

A device 100 for rotating the dividing wheel 68e is provided between the end plate 92 and the end wall 99 as shown in FIG. 8. The wheel rotating device 100 comprises a conventional double-acting ratchet mechanism 101 and means for actuating the ratchet mechanism 101, such as a fluid cylinder 102. The ratchet mechanism 101 includes a ratchet 103 encircling and secured to the shaft 94, and a pair of pawl members 104 and 105 engageable with the ratchet 103 and pivotally connected to a pair of arms 106 and 107, respectively, rotatably supported on the shaft 94, as shown in FIG. 7. The arms 106 and 107 are pivotally connected to a pair of links 108 and 109, respectively, which are in turn pivotally fastened to a connector 110. The pivotal connection of these various elements allows for their free pivotal movement relative to one another by, for example, using pins for connection.

The pawl members 104 and 105 are urged, by springs or any other appropriate biasing means not shown, in the directions indicated by arrows 114 and 115 (FIG. 7) respectively, in which the pawl members 104 and 105 are maintained in engagement with the ratchet 103. The cylinder 102 is supported on a frame 111 secured to the casing 91 and has a piston rod 102a threadedly connected with the connector 110 as shown in FIG. 8.

The ratchet 103 is square in shape and has a tooth 103a at each corner as shown in FIG. 7. With each reciprocatory motion of the piston rod 102a, the pawl member 104 or 105 engages one of the teeth 103a on the ratchet 103 to rotate the ratchet 103 by an angle of 90° in the direction of an arrow 112 (FIG. 7), whereby the dividing wheel 68e is also rotated by 90° each time. The rotation of the dividing wheel 68e allows one of its compartments 68ae to receive through an inlet 113 a predetermined quantity of coagulated soybean milk from a hopper 60e. As soon as each compartment 68ae filled with coagulated soybean milk turns downward and opens to the outlet 97 of the casing 91, its contents are discharged through the outlet 97 into a bean curd cup positioned therebelow. During the downward movement of each compartment 68ae filled with coagulated soybean milk, the lye or residual coagulant solution remaining in the cavities in or among the lumps of coagulated soybean milk is expelled through the apertures 94a and 93a or 98a.

In FIGS. 7 through 9, certain parts which are functionally similar to their counterparts in the embodiment of FIGS. 1 through 6, are indicated by the same reference numerals followed by the suffix "e" to facilitate the reader's understanding without any repeated description.

Further modifications or variations may be possible to the device of FIGS. 7 through 9 without departing from the principles of this invention. For example, the number of the compartments 68ae in the dividing wheel 68e, which is four in the embodiment of FIGS. 7 through 9, may be changed as desired with the number of the teeth 103a on the ratchet 103 being changed accordingly.

The device Ee of FIGS. 7 through 9 is further advantageous due to the fact that during the transfer of coagulated soybean milk from the hopper 60e into each compartment 68ae, the weight of the coagulated soybean milk in the upper portion of the hopper 60e beans on the coagulated soybean milk in the lower portion of the hopper 60e or in the compartment 68ae, whereby the latter coagulated soybean milk is compressed or squeezed to drive out any excess residual water or fluid soybean milk. In order to remove such residue from the compartment 68ae, it is useful to provide a multiplicity of additional draining apertures in the dividing walls 95, blades 96 and end walls 98 and 99 which define each compartment 68ae altogether, or to construct any such walls from perforated structural members. It will, further, be useful to provide a weight providing plate or member adapted to apply pressure onto the coagulated soybean milk in the hopper 60e, whether vertically or in any other appropriate direction, to enhance the aforementioned squeezing effect, instead of relying merely upon the weight of the hopper contents per se.

While the invention has hereinabove been described with reference to a preferred embodiment thereof and several modifications thereto, it should be understood that further modifications or variations may be easily made by those skilled in the art without departing from the spirit and scope of this invention as defined by the appended claims.

What is claimed is:

1. A method of manufacturing coarse-grained bean curd, comprising:
   breaking a mass of coagulated soybean milk into lumps and supplying said lumps into a series of successively moving cups;
   adding fluid soybean milk into each of said cups to effect bonding of said lumps by mixing said fluid soybean milk with residual coagulant solution, produced during said breaking, said amount of soybean milk added is just sufficient to be coagulated by said residual coagulant solution; and
   heating said each cup with its contents at a temperature sufficient to coagulate the soybean milk and to effect bonding of said lumps to thereby form said lumps into a cake of bean curd.

2. A method as defined in claim 1, further including between said adding and said heating:
   adding additional fluid soybean milk containing coagulant into said each cup to fill said each cup substantially to its full capacity.

3. A method as defined in claim 1, further including between said adding and said heating:
   closing said each cup.

4. A method as defined in claim 2, further including between said adding of said fluid soybean milk containing coagulant and said heating:
   closing said each cup.

5. A method as defined in claim 4, further including after said heating:
   cooling said cake of bean curd in said each cup.

6. A method as defined in claim 5, further including before said closing:
   stirring the contents of said each cup.

* * * * *